US012131177B2

(12) United States Patent
Nedelcu et al.

(10) Patent No.: US 12,131,177 B2
(45) Date of Patent: Oct. 29, 2024

(54) METHOD FOR PROVIDING CERTIFICATES IMPLEMENTED BY A VIRTUALIZED COMPUTING PLATFORM

(71) Applicant: Orange, Issy-les-Moulineaux (FR)

(72) Inventors: Adina Ioana Nedelcu, Châtillon (FR); Ghada Arfaoui, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 447 days.

(21) Appl. No.: 17/604,657

(22) PCT Filed: Apr. 16, 2020

(86) PCT No.: PCT/EP2020/060725
§ 371 (c)(1),
(2) Date: Oct. 18, 2021

(87) PCT Pub. No.: WO2020/212501
PCT Pub. Date: Oct. 22, 2020

(65) Prior Publication Data
US 2022/0253330 A1 Aug. 11, 2022

(30) Foreign Application Priority Data
Apr. 19, 2019 (FR) ...................................... 1904219

(51) Int. Cl.
*G06F 9/455* (2018.01)
*H04L 9/40* (2022.01)

(52) U.S. Cl.
CPC .......... *G06F 9/45558* (2013.01); *H04L 63/18* (2013.01); *G06F 2009/45587* (2013.01); *H04L 63/166* (2013.01)

(58) Field of Classification Search
None
See application file for complete search history.

(56) References Cited

U.S. PATENT DOCUMENTS

2017/0093677 A1* 3/2017 Skerry ................. H04L 43/20
2017/0177854 A1* 6/2017 Gligor ................. G06F 21/44
(Continued)

FOREIGN PATENT DOCUMENTS

EP         3217310 A1   9/2017
WO   WO 2018162060 A1   9/2018

OTHER PUBLICATIONS

Yan et al.; "A software-based root-of-trust primitive on multicore platforms"; Mar. 2011; ASIACCS '11: Proceedings of the 6th ACM Symposium on Information, Computer and Communications Security; pp. 334-343. (Year: 2011).*
(Continued)

*Primary Examiner* — Umut Onat
(74) *Attorney, Agent, or Firm* — Knobbe, Martens, Olson & Bear, LLP

(57) ABSTRACT

A method for providing certificates is described, the method implemented by a virtualized computing platform comprising a root of trust, a hypervisor and at least one virtual machine, the hypervisor implementing one virtualized root of trust per virtual machine and offering root of trust services. The method includes establishing a first secure channel between the hypervisor and a verification entity, sending certification data of the hypervisor in the first secure channel to the verification entity, reception by the hypervisor, in the first secure channel, from the verification entity, of at least one piece of cryptographic data, establishing a second secure channel between each virtual machine and the verification entity, and ending certification data of each virtual machine in the second secure channel established for the virtual machine, depending on the associated virtualized root of trust.

11 Claims, 4 Drawing Sheets

(56) References Cited

U.S. PATENT DOCUMENTS

2018/0004953 A1* 1/2018 Smith, II .............. H04L 9/3268
2018/0091551 A1* 3/2018 Palanigounder .... G06F 9/45558
2020/0145008 A1* 5/2020 Strukov ............. G11C 16/0425

OTHER PUBLICATIONS

International Search Report and Written Opinion dated May 6, 2020 for Application No. PCT/EP2020/060725.
Etsi. Network Functions Virtualisation (NFV); Trust; Report on Attestation Technologies and Practices for Secure Deployments Oct. 31, 2017 (Oct. 31, 2017). pp. 2017-10. Retrieved from the Internet: https :/ /www.etsi.org/deliver/etsi_gr/NFV -SEC/00 I_099/007 /01.01.01_60/gr_nfv-sec007v010101 p.pdf [retrieved on Jan. 30, 2020].

* cited by examiner

METHOD FOR PROVIDING CERTIFICATES IMPLEMENTED BY A VIRTUALIZED COMPUTING PLATFORM

RELATED APPLICATIONS

This application is the U.S. National Phase of Application No. PCT/EP2020/060725 entitled "METHOD FOR PROVIDING CERTIFICATES IMPLEMENTED BY A VIRTUALIZED COMPUTING PLATFORM" and filed Apr. 16, 2020, which claims the benefit of French Patent Application No. 1904219, filed Apr. 19, 2019, each of which is incorporated by reference in its entirety.

Prior Art

The invention relates to the field of virtualized computer platforms.

FIG. 1 shows the known architecture of such a platform PIV. It includes in this example three layers, namely:
- a hardware layer CM;
- a VMM (Virtual Machine Manager) or hypervisor layer; and
- a layer of virtual machines or VMs.

In general, the virtualization mechanism gives the resources of a layer the perception that they have exclusive use of potentially shared underlying resources, these underlying resources appearing in the form of multiple isolated instances allocated to resources of a higher layer. Each higher-level resource estimates that it has the exclusive use of functionality rendered by underlying resources and does not know that it is not executing directly on the hardware.

The virtualized computer platform can be used to provide functionality of a new-generation mobile network or implement an NFV (Network Function Virtualization) platform.

Each virtual machine executes an instance of unique operating system, called the guest operating system, and functions independently of the other virtual machines of the platform. Each guest operating system requires an isolated virtual machine for its execution.

The virtualization software layer VMM or hypervisor is a layer executing under the virtual machines supplying the execution environment.

This invention is specifically located in the context of virtualized computer platforms including a RoT (Root of Trust).

Conventionally, such a Root of Trust RoT is configured to execute one or more specific functions for securing the virtual platform PIV. It is therefore an element trusted to behave in an expected manner, since a bad behavior of the Root of Trust RoT cannot be detected. It should be noted that such a Root of Trust RoT may be composed of software elements but it is preferably implemented in the form of a hardware module.

The Root of Trust RoT thus offers services for improving the security of the platform PIV. It is in particular used to store and protect the cryptographic keys of the platform PIV, since these keys cannot be used by the other resources without this Root of Trust RoT.

This Root of Trust RoT may be composed of a trusted module TPM in compliance with the technical specifications defined by the consortium Trusted Computing Group (TCG). It may in particular be compliant with the ISO/IEC 11889 standard.

In the example in FIG. 1, the hypervisor VMM includes, for each virtual machine VM, a vRoT (Virtualized Root of Trust) which supplies to the guest operating system of this virtual machine VM the services of the Root of Trust RoT. Such a virtualized Root of Trust vRoT therefore refers to a combination of functionality supplied by the associated Root of Trust RoT, as well as by the hypervisor (the latter giving access to the functionality of the Root of Trust RoT).

In the example in FIG. 1, the virtualized computer platform PIV includes two virtual machines VM1, VM2, each virtual machine VMi benefiting from the resources of a virtualized Root of Trust vRoTi, the virtualized Roots of Trust vRoTi being independent instances representing the same Root of Trust RoT.

The invention is not limited to such an architecture.

For more information on the concepts and definitions introduced for FIG. 1, those skilled in the art may refer to the document [TCG].

The invention is more specifically located in the context of attestation of virtualized computer platforms.

In general, in the context of the invention, attestation is a process allowing a virtualized computer platform to assert a property to a verifying entity, by providing the proof of this property to this entity. For example, the virtualized computer platform may assert that it is trustworthy and that it has not been corrupted. In this example this attestation process consists in supplying proof of the integrity of the platform.

Other properties may be the subject of an attestation of the platform, and in particular, still by way of example:
- an attestation relating to the location of the platform;
- an attestation relating to access rights managed by the platform.

The invention is even more specifically located in the context of deep attestation wherein such an attestation process is effected for each of the layers of the virtualized computer platform.

In practice, the attestation of the hardware layer CM is implicit since it is directly conferred by the Root of Trust RoT present in this layer.

Consequently, taking again the example of FIG. 1, the deep attestation of the platform PIV entails:
- the attestation from each virtual machine VM;
- the attestation from the virtualization layer (or hypervisor) VMM; and
- the supplying of a verifiable and explicit link between the layers (layer binding problem) proves that the different attestations (attestation of the hypervisor VMM, attestation from each of the virtual machines VMs) have indeed been delivered for layers of one and the same platform PIV.

The trust status of a virtualized computer platform PIV can be determined by a third party solely using primitives of the Root of Trust RoT, these primitives being intrinsically reliable and implemented by a software, but preferably hardware, module of this platform.

The virtualization layer VMM (in other words the hypervisor) uses the hardware Roots of Trust RoT of the trusted hardware module to generate its attestation data.

These hardware Roots of Trust RoT in particular offer services for the protection of cryptographic keys and services for the secure execution of cryptographic operations. These services are necessary to allow a third party to check the trust status of the platform PIV.

Unlike the virtualization layer VMM which must execute directly on the hardware layer CM, the virtual machines VM execute in an execution environment created by the hypervisor, also known as the virtual platform.

These virtual platforms can use the functionality of the hardware Roots of Trust RoT, but the hypervisor is involved in the configuration of access to this functionality as well as in the communication between these virtual platforms and the hardware Roots of Trust RoT.

These security-improving services, for example for protecting cryptographic keys and services for the secure execution of cryptographic operations, may themselves be considered as virtualized Roots of Trust vRoTi.

As mentioned previously, the attestation of a virtualized computer platform entails steps of reporting and verifying of all its software components, in other words of the virtual machines VMi and of the virtualization layer or hypervisor VMM.

For its attestation, each virtual machine VMi makes use of the secure virtual platform instance that is associated with it, and in particular the security functionality offered by the virtualized Roots of Trust vRoTi.

These virtualized Roots of Trust vRoTi can be implemented in software and/or hardware form, in the sense that the virtualized Root of Trust vRoTi communicates with the RoT. They have the aim of inferring the trust in the attestations of the virtual machines VM by setting up a chain of trust from the hardware layer CM all the way to the virtual machine.

Consequently, an evaluation of the state of the virtual machine can only be made if the state of the hypervisor VMM is also validated as part of the attestation of this virtual machine VMi.

This process constitutes the deep attestation previously introduced: it makes it possible to extend the trust of the Roots of Trust RoT, going through the hypervisor with the implementation of the virtualized Roots of Trust vRoTi, all the way to the virtual machines VMi and therefore to the virtualized computer platform PIV as a whole.

A deep attestation entails the retrieval and subsequent validation, by a remote verifying entity, of the attestation data from the virtual machines VMi and of the attestation data from the underlying hypervisor VMM. From the point of view of the remote verifier, these two attestation reports may be supplied by two independent entities. Consequently, the remote verifying entity requires proof that the hypervisor VMM, to which it testifies as part of a deep attestation, is really executing an instance of the virtualized Root of Trust vRoTi associated with the target virtual machine VMi of the attestation. This problem of creation of an explicit and verifiable link between the attestation of a virtual machine and the attestation of the hypervisor on which the instances vRoT of the virtual machine execute constitutes the layer binding problem already mentioned.

FIGS. 2A and 2B illustrate two deep attestation models, which differ by the way in which the attestation data from the hypervisor are transmitted to the remote verifying entity:
    via the attestation channel of the virtual machine VM (single-channel deep attestation); or
    via a dedicated separate channel (multi-channel deep attestation).

FIG. 2A represents the known mechanism of single-channel deep attestation.

In this model, the remote verifying entity EV sets up a channel of communication C with the virtual machine VM via which it obtains the attestation data specific to the virtual machine VM as well as the attestation data from the hypervisor VMM on which the virtual machine executes.

In this model, the layer binding problem can be solved by including, in the attestation data from the hypervisor, data specific to the virtual trusted module vRoT thus supplying verifiable cryptographic proof of the layer binding.

This model is not adapted to deployments in which a large number of virtual machines execute on the same hypervisor, particularly since the generation of multiple attestation reports of the hypervisor cannot be done in parallel.

FIG. 2B represents the known model of multi-channel attestation in which the remote verifying entity EV sets up a first channel C1 of communication with the virtual machine to retrieve its attestation data, then, subsequently, a second independent channel C2 of communication with the hypervisor to retrieve its attestation data.

This model adapts well to deployments involving a large number of virtual machines executing on one and the same hypervisor. Unfortunately, the link between the attestation data from the different layers is very loose, and the layer binding problem is not easy to solve.

For more information about attestation mechanisms, those skilled in the art may refer to references [NFV] and [PRA].

The aim of the invention is to offer a mechanism of deep attestation of a virtualized computer platform which does not have the drawbacks of the prior art.

SUMMARY OF THE INVENTION

According to a first aspect, the invention relates to a method for supplying attestations implemented by a virtualized computer platform including a Root of Trust, a hypervisor and at least one virtual machine, the hypervisor implementing a virtualized Root of Trust by virtual machine and offering services of the Root of Trust, this method including:
    a step of setting up a first secure channel between this hypervisor and a verifying entity;
    a step of sending attestation data from this hypervisor over said first secure channel toward the verifying entity, these attestation data being obtained using services of the Root of Trust;
    a step of receiving, by the hypervisor, over the first secure channel, coming from the verifying entity, at least one cryptographic datum intended for the Root of Trust;
    a step of setting up a second secure channel between at least one virtual machine and the verifying entity, primitives of the Root of Trust applied to the cryptographic datum being required for the setting-up of this second secure channel;
    a step of sending attestation data from said virtual machine over the secure channel set up for this virtual machine, these virtual machine attestation data being obtained by the virtual machine using services of the virtualized Root of Trust associated with said virtual machine.

Correspondingly, the invention relates to a virtualized computer platform including a Root of Trust, a hypervisor and at least one virtual machine, the hypervisor implementing a virtualized Root of Trust by virtual machine and offering services of the Root of Trust, wherein:
    said hypervisor is configured to:
        set up a first secure channel with a verifying entity;
        obtain attestation data from this hypervisor using services of the Root of Trust;
        send said attestation data from this hypervisor over said first secure channel toward the verifying entity;
        receive, coming from said verifying entity, over the first secure channel, at least one cryptographic datum intended for the Root of Trust;
    each said virtual machine is configured to:
        set up a second secure channel between this virtual machine and the verifying entity, primitives of the Root of Trust applied to the cryptographic datum being required for the setting-up of this second secure channel;

send attestation data from this virtual machine over the second secure channel set up for this virtual machine, these attestation data being obtained by the virtual machine using services of the virtualized Root of Trust associated with said virtual machine.

Correspondingly, the invention also relates to a set of computer programs including:

a computer program on an information medium, this program being able to be implemented by a hypervisor of a virtualized computer platform, this program including instructions configured to:

set up a first secure channel between the hypervisor and a verifying entity;

send attestation data from this hypervisor over the first secure channel toward the verifying entity, these attestation data being obtained using services of a Root of Trust of the platform;

receive at least one cryptographic datum coming from the verifying entity over the first secure channel, this cryptographic datum being intended for the Root of Trust;

a computer program on an information medium, an instance of this program being able to be implemented by a virtual machine of the virtualized computer platform, this program instance including instructions configured to:

set up a second secure channel between the virtual machine and the verifying entity, primitives of the Root of Trust applied to the cryptographic datum being required for the setting-up of this second secure channel;

send attestation data from the virtual machine over the second secure channel, these attestation data being obtained by the virtual machine using services of a virtualized Root of Trust from the hypervisor associated with the virtual machine and offering services of said Root of Trust.

According to a second aspect, the invention also relates to a method for requesting attestations from a virtualized computer platform including a Root of Trust, a hypervisor and at least one virtual machine, the hypervisor implementing a virtualized Root of Trust by virtual machine and offering services of the Root of Trust, this method being implemented by a verifying entity and including:

a step of setting up a first secure channel between the verifying entity and the hypervisor;

a step of receiving attestation data from the hypervisor in the first secure channel;

a step of sending, to the hypervisor, over the first secure channel, at least one cryptographic datum intended for the Root of Trust;

a step of setting up a second secure channel between this verifying entity and each of the virtual machines, primitives of the Root of Trust applied to the cryptographic datum being required for the setting-up of this second secure channel;

a step of receiving attestation data from each virtual machine over the second secure channel set up for this virtual machine, these attestation data being obtained by the virtual machine using the services of the virtualized Root of Trust associated with said virtual machine.

Correspondingly the invention also relates to a verifying entity configured to request attestations from a virtualized computer platform including a Root of Trust, a hypervisor and at least one virtual machine, the hypervisor implementing a virtualized Root of Trust by virtual machine and offering services of the Root of Trust, this verifying entity including:

a module for setting up a first secure channel between the verifying entity and the hypervisor;

a communicating module configured to:

receive attestation data from the hypervisor over the first secure channel;

send at least one cryptographic datum to the hypervisor over the first secure channel, this cryptographic datum being intended for the Root of Trust; and a module for setting up a second secure channel between the verifying entity and each of the virtual machines, primitives of the Root of Trust applied to the cryptographic datum being required for the setting-up of this second secure channel;

a communicating module configured to receive attestation data from each virtual machine over the second secure channel set up for this virtual machine, these attestation data being obtained by the virtual machine using services of the virtualized Root of Trust associated with the virtual machine.

The invention also relates to a computer program on an information medium, this program including instructions suitable for implementing the steps of the method for requesting attestations according to the invention.

Each of these programs can use any programming language, and be in the form of source code, object code, or intermediate code between source code and object code, such as in a partly compiled form, or in any other desirable form.

The invention also relates to an information medium readable by a computer, and including instructions of a computer program as mentioned above.

The invention medium can be any entity or device capable of storing the program. For example, the medium can include a storage means, such as a ROM, for example a CD-ROM or a microelectronic circuit ROM, or else a magnetic recording means, for example a hard disk.

Moreover, the information medium can be a transmissible medium such as an electrical or optical signal, which can be conveyed via an electrical or optical cable, by radio or by other means. The program according to the invention can in particular be downloaded over a network of Internet type.

Alternatively, the information medium can be an integrated circuit in which the program is incorporated, the circuit being suitable for executing or for being used in the execution of the method in question.

Thus, and in general, the invention makes provision, for providing proof of the link between the attestation data from the different layers, to set up secure channels (second channels within the meaning of the invention) between each virtual machine and the verifying entity, such a secure channel being set up using primitives of the Root of Trust of the platform applied to a cryptographic datum sent by the verifying entity over the first secure channel set up with the hypervisor.

Consequently, only the layers able to use the services of the Root of Trust (directly for the hypervisor or indirectly for the virtual machines via the virtualized Roots of Trust) can be the origin of these secure channels.

The invention thus provides the proof of a verifiable and explicit link between the hardware layer hosting the Root of Trust, the hypervisor, and the virtual machines of the virtualized computer platform.

In an embodiment, the verifying entity produces a deep attestation report of the platform.

In the embodiment described here, this report is positive if the secure channels set up between said virtual machine and the verifying entity have been able to be set up. This report includes:

the attestation data from the hypervisor; and
the attestation data from each virtual machine.

The cryptographic datum sent by the verifying entity to the hypervisor over the first secure channel and used by the Root of Trust to set up the secure channels between the virtual machines and the verifying entity can be of any kind whatsoever.

In a particular embodiment of the invention, the verifying entity includes a server, the hypervisor includes a client, this client and this server being configured to set up between them the first secure channel as part of a first session in accordance with the TLS protocol. This first secure channel is used:

by the hypervisor to send its said attestation data to the verifying entity; and by
the verifying entity to send the cryptographic datum to the hypervisor.

The TLS protocol can be used to set up the secure channel even if the virtual machines and the verifying entity then use another protocol.

In a particular embodiment the TLS protocol is also used to set up the second secure channels. More precisely:

the cryptographic data sent by the verifying entity over the first secure channel TLS include, associated with each virtual machine, a ticket and a single-use random variable;
the Root of Trust is configured to compute, for each virtual machine, a pre-shared key using the single-use random variable associated with this virtual machine;
the pre-shared key is used by the virtual machine to request the setting-up of a second session with the verifying entity, this second session constituting a resumption of the first session in accordance with the TLS protocol;
the second secure channel used by a virtual machine to send its attestation data to the verifying entity being set up as part of said second session.

The use of the TLS protocol advantageously makes it possible to set up the second channels quickly.

BRIEF DESCRIPTION OF THE DRAWINGS

Other features and advantages of this invention will become apparent from the description given above, with reference to the appended drawings which illustrate an exemplary embodiment thereof without any limitation. In the figures.

DESCRIPTION OF THE EMBODIMENTS

Figure 3:
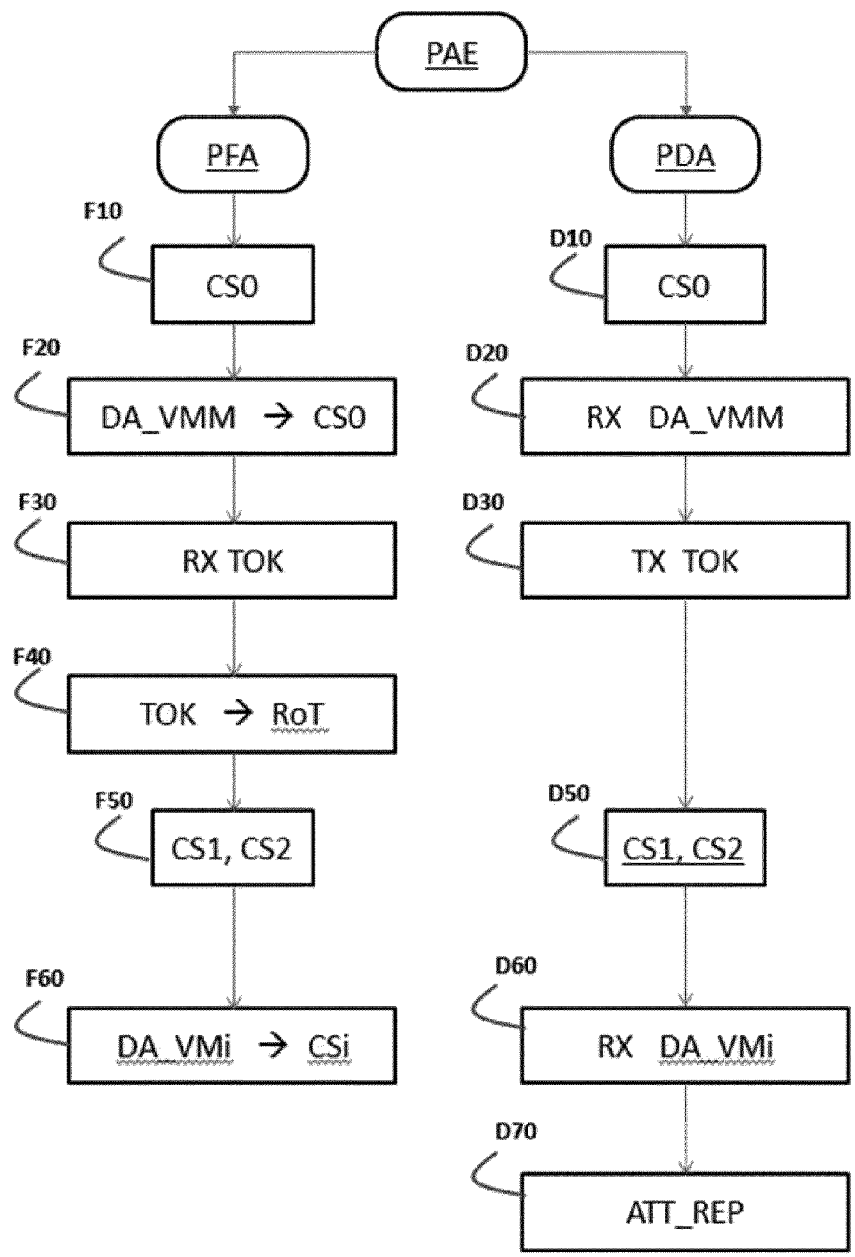
FIG. 3 shows, in the form of a block diagram, the main steps of a deep attestation method in accordance with the invention.

FIG. 3 shows, in the form of a block diagram, the main steps of a deep attestation method PAE of a virtualized computer platform PIV in accordance with the invention.

This method is in accordance with a particular embodiment of the invention.

It is implemented by the virtualized computer platform PIV in accordance with the invention and by a verifying entity EV in accordance with the invention.

More precisely:

the virtualized computer platform PIV implements steps F10 to F60 of a method PFA for supplying attestations in accordance with the invention; and
the verifying entity EV implements steps D10 to D60 of a method PDA for requesting attestations in accordance with the invention.

In this embodiment, the hypervisor VMM of the platform PIV and the verifying entity set up a first secure channel CS0. The setting-up of this first channel CS0 corresponds to a step D10 of the attestation-requesting method PDA and to a step F10 of the attestation-supplying method PFA.

During a step F20 of the attestation-supplying method, the hypervisor VMM sends, over the first secure channel CS0, toward the verifying entity VM, attestation data from this hypervisor. These data are obtained by the hypervisor using services of said Root of Trust RoT of the hardware layer. They are received by the verifying entity EV during a phase D20 of the attestation-requesting method.

During a step D30, the verifying entity EV sends, to the hypervisor VMM, over the first secure channel CS0, at least one cryptographic datum TOK toward the Root of Trust RoT of the platform PIV. This cryptographic datum TOK is received by the hypervisor VMM during a step F30.

The hypervisor VMM stores the cryptographic datum TOK in said Root of Trust RoT during a step F40.

Then, in each virtual machine of the platform PIV sets up a secure channel with the verifying entity EV. This setting-up corresponds to a step D50 of the attestation-requesting method PDA and to a step F50 of the attestation-supplying method PFA.

In accordance with the invention, primitives of the Root of Trust RoT applied to the cryptographic datum TOK are required for the setting-up of this second secure channel.

During a step F60, each virtual machine sends its own attestation data to the verifying entity EV over the secure channel set up for this virtual machine.

These attestation data are received by the verifying entity EV during a step D60.

In accordance with the invention, the secure channels set up between each of the virtual machines and the verifying entity are set up using primitives of the Root of Trust of the platform applied to the cryptographic datum sent by the verifying entity over the first secure channel set up with the hypervisor VMM.

Consequently, only the layers able to use the services of the Root of Trust (directly for the hypervisor VMM or indirectly for the virtual machines VM) may be the origin of these secure channels.

The invention thus provides the proof of a verifiable and explicit link between the hardware layer hosting the Root of Trust RoT, the hypervisor VMM, and the virtual machines of the virtualized computer platform PIV.

In the embodiment described here, the verifying entity EV produces a deep attestation report of the platform PIV during a step D70.

In the embodiment described here, this report is positive if it has been possible to set up the secure channels set up between each virtual machine and the verifying entity EV. This report includes:
- the attestation data from the hypervisor; and
- the attestation data from each virtual machine.

In an embodiment of the invention, the verifying entity EV and the virtualized computer platform PIV communicate according to the TLS protocol. The concepts of this protocol important to the understanding of this embodiment will now be described with reference to FIG. 4.

This figure more precisely illustrates operations carried out by a client CLT_TLS and a server SRV_TLS in the implementation of the TLS protocol.

The TLS protocol comprises a negotiation, or "handshake" protocol HS which authenticates the communicating parts, negotiates the modes and cryptographic parameters allowing the computation, by the client CLT_TLS and by the server SRV_TLS, during a step T10, of a shared master secret MS.

This shared master secret MS is used by the parties to derive their cryptographic keys, such as channel encryption keys.

During a step T20, the server SRV_TLS randomly draws a nonce NONCEi, namely a single-use random or pseudo-random number for each virtual machine VMi. The server uses the shared master secret MS for computing tickets TICKi, using these nonces NONCEi. The server SRV_TLS sends to the client CLT_TLS the tickets TICKi associated with their nonces NONCEi.

More precisely, the server SRV_TLS computes as many tickets TICKi as its envisioned amount of session resumptions on the initiative of the client CLT_TLS.

During a step T30, the server SRV_TLS and the client CLT_TLS compute, for each ticket TICKi, a pre-shared key PSKi obtained using the shared master secret MS and the nonce NONCEi associated with this ticket.

These tickets TICKi may be used by the client CLT_TLS to quickly start future negotiations.

More precisely, when the client CLT_TLS wishes to start a new session based on a preceding session ("resume"), the client device sends in its first message to the server, during a step T40, a ticket TICKi.

During a step T45, the client CLT_TLS and the server SRV_TLS compute a new shared secret MSi' using their respective pre-shared keys PSKi.

This new shared secret MSi' is used to mount a new secure channel as part of the new session requested by the virtual machine VMi with the verifying entity EV.

This mechanism of the TLS protocol advantageously makes it possible to simplify the exchange of keys, parameters, and the authentication of the server of the new session (general step T50). If the two parties accept this new session, in other words if the new secrets determined by the client CLT_TLS and the server SRV_TLS correspond, this implies that it is these same parties CLT_TLS and SRV_TLS that took part in the initial negotiation phase HS.

For more information about the TLS protocol, those skilled in the art may refer to the reference [TLS].

Figure 5:
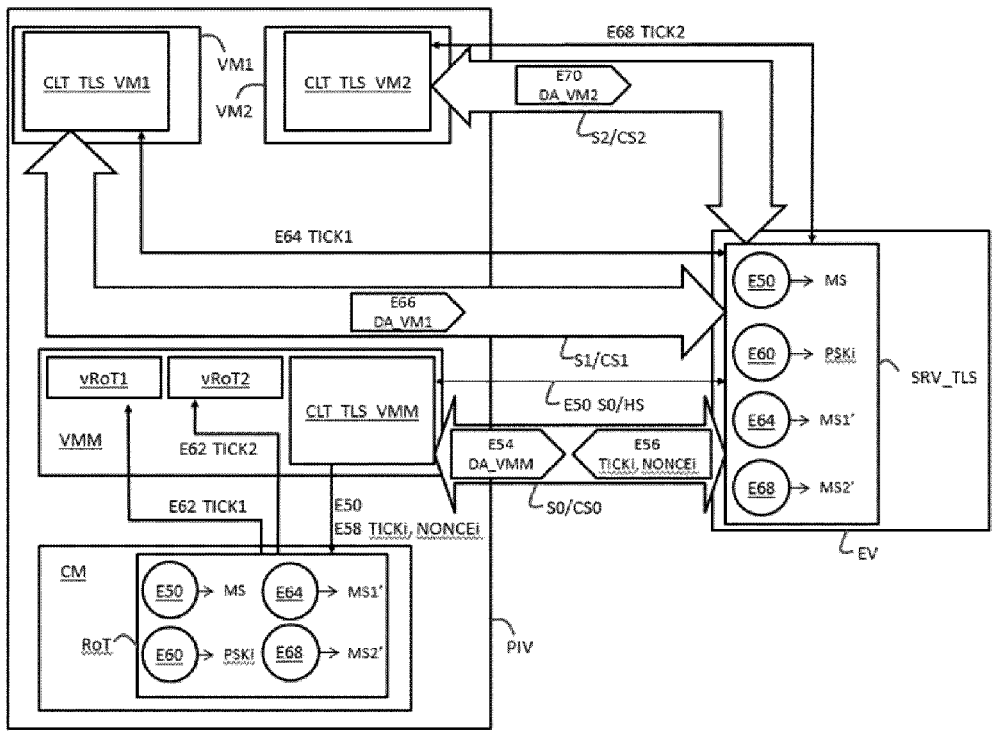
FIG. 5 illustrates a particular embodiment of the invention wherein the verifying entity and the virtualized computer platform communicate in accordance with the TLS protocol.

FIG. 5 illustrates the embodiment of the invention in which the verifying entity EV in accordance with the invention and the virtualized computer platform PIV in accordance with the invention communicate according to the TLS protocol.

In this embodiment:
- the verifying entity EV includes a server SRV_TLS;
- the hypervisor VMM includes a client CLT_TLS_VMM; and
- each virtual machine VMi includes a client CLT_TLS_VMi.

During a preliminary step, not shown, the verifying entity EV sends a message to the virtualized computer platform so that the client CLT_TLS_VMM of the hypervisor VMM makes a request to set up a session to the server SRV_TLS of the verifying entity EV.

Figure 1:
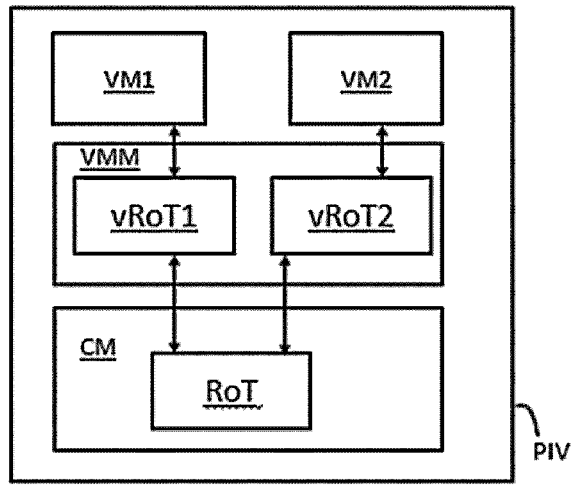
FIG. 1 already described shows the architecture of a virtualized computer platform in accordance with the prior art.
Figure 2A:
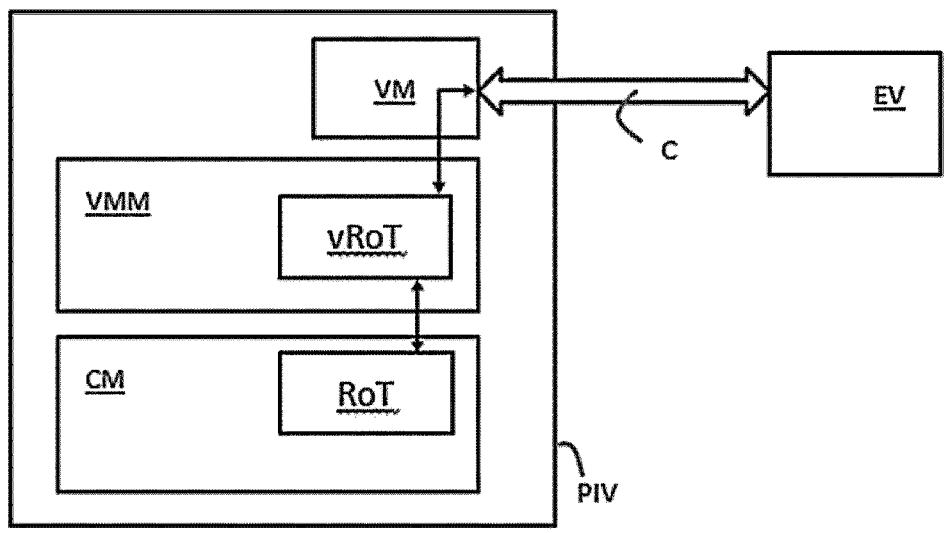
FIG. 2A already described illustrates the single-channel deep attestation mechanism of the prior art.
Figure 2B:
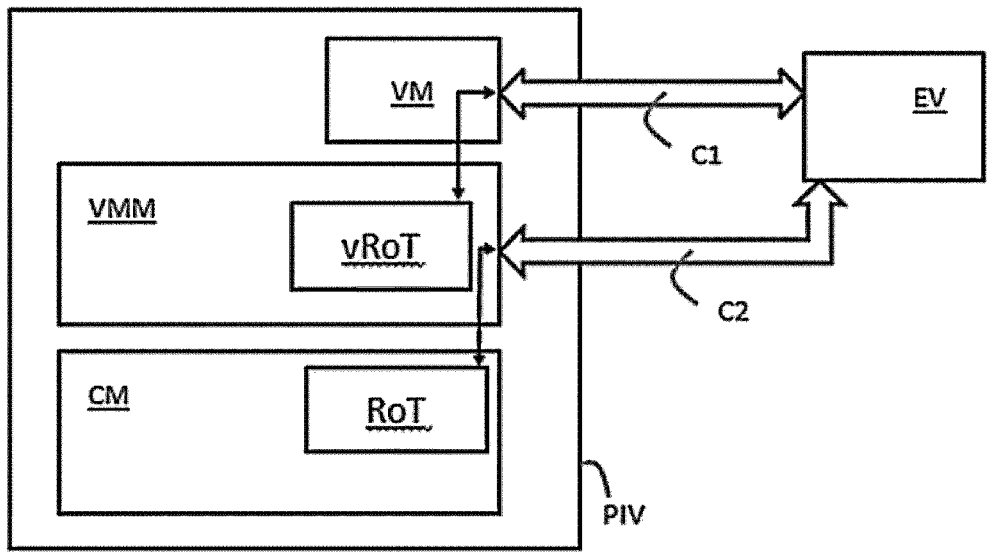
FIG. 2B already described illustrates the multi-channel deep attestation mechanism of the prior art.
Figure 4:
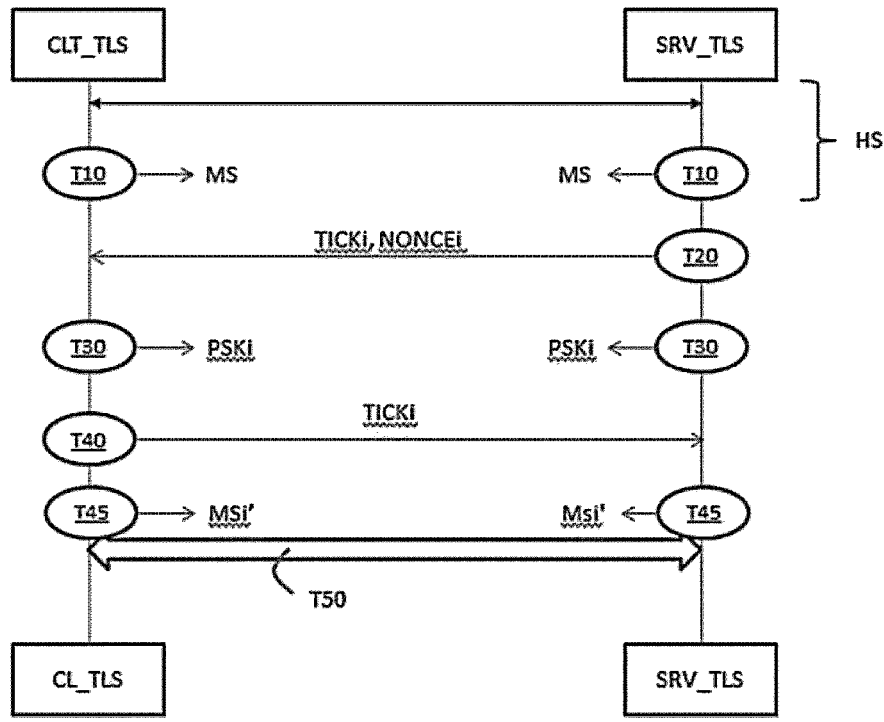
FIG. 4 illustrates known concepts of the TLS protocol useful to the understanding of a particular embodiment of the invention.

During a general step E50, the server SRV_TLS of the verifying entity EV and the client CLT_TLS_VMM of the hypervisor VMM carry out as part of a first session S0 a negotiation phase in accordance with the invention with the TLS protocol (handshake) similar to the phase HS previously described with reference to FIG. 4.

It is recalled that this phase of negotiation HS particularly includes the computation of a shared master secret MS by the client CLT_TLS_VMM of the hypervisor VMM on the one hand and by the server SRV_TLS of the verifying entity EV on the other.

To compute this shared master secret MS, the client CLT_TLS_VMM of the hypervisor VMM invokes primitives of the Root of Trust RoT of the platform PIV. These primitives compute the shared master secret MS and record it securely in the Root of Trust RoT. In other words, the client CLT_TLS_VMM of the hypervisor delegates the computation of the shared master secret MS to the Root of Trust RoT.

The negotiation phase makes it possible to set up, for the duration of the first session S0, a secure channel CS0 between the verifying entity EV and the hypervisor VMM.

This secure channel CS0 is used by the hypervisor VMM to communicate (step E54) its attestation data DA_VMM to the verifying entity EV, these data being obtained by the hypervisor using the services of the Root of Trust RoT.

Still in the course of the same session S0, the server SRV_TLS of the verifying entity EV sends (step E56) to the client CLT_TLS_VMM as many tickets TICKi as there are virtual machines VMi in the virtualized computer platform PIV, each ticket being associated with a nonce NONCEi. This number of virtual machines has been able to be communicated previously by the hypervisor VMM to the verifying entity EV. Specifically, the server SRV_TLS expects each of the virtual machines VMi to initiate its own session with it to communicate its attestation data DA_VMi to it.

During a step E58, the client CLT_TLS_VMM of the hypervisor VMM communicates these ticketsi|nonce TICKi|NONCEi pairs to the Root of Trust RoT of the platform PIV.

During a step E60, the server SRV_TLS and the Root of Trust RoT compute, for each ticket TICKi, a pre-shared key PSKi on the basis of the shared master secret MS and of the nonce NONCEi associated with this ticket.

During a step E62, the virtualized trusted module vRoTi associated with each virtual machine VMi obtains a ticket TICKi.

Once the tickets and nonces TICKi|NONCEi have been sent by the verifying entity EV (step E56) to the client CLT_TLS_VMM of the hypervisor VMM, the session S0 terminates.

During a step E64, the client CLT_TLS_VM1 of the virtual machine VM1 asks to start a new session S1 with the server SRV_TLS of the verifying entity EV by sending it the ticket TICK1. A new secret MS1' is computed by the Root of Trust RoT and by the server SRV_TLS on the basis of their respective values of the pre-shared key PSK1.

This new session is set up if the new secrets MS1' are identical and takes place in accordance with the steps T45/T50 previously described with reference to FIG. 4.

A secure channel CS1 is set up, for the duration of this session S1, between the verifying entity EV and the virtual machine VM1.

This secure channel CS1 is used by the virtual machine VM1 to communicate (step E66) its attestation data DA_VM1 to the verifying entity EV, these data being obtained by the virtual machine VM1 using the services of the virtualized Root of Trust vRoT1.

Once the attestation data DA_VM1 have been sent to the verifying entity EV, the session S1 terminates.

During a step E68, the client CLT_TLS_VM2 of the virtual machine VM2 asks to start a new session S2 with the server SRV_TLS of the verifying entity EV by sending it the ticket TICK2. A new secret MS2' is computed by the Root of Trust RoT and by the server SRV_TLS on the basis of their respective values of the pre-shared key PSK2.

A secure channel CS2 is set up for the duration of this session S2, between the verifying entity EV and the virtual machine VM2.

This secure channel CS2 is used by the virtual machine VM2 to communicate (step E70) its attestation data DA_VM2 to the verifying entity EV, these data being obtained by the virtual machine VM2 using the services of the virtualized Root of Trust vRoT2.

Once the attestation data DA_VM2 have been sent to the verifying entity EV, the session S2 terminates.

The verifying entity EV thus received:
the attestation data DA_VMM from the hypervisor;
the attestation data DA_VMi from each of the virtual machines VMi.

The secure channels CS1 and CS2 were set up on the basis of the tickets TICK1 and TICK2 received from the verifying entity EV and pre-shared keys PSK1, PSK2 computed by the Roots of Trust RoT on the basis of the shared master secret MS and the nonces NONCE1, NONCE2. In addition, the sessions S1 and S2 are sessions derived from the first session S0 of the negotiation phase HS.

Consequently, only the layers able to use the services of the Root of Trust RoT (directly for the hypervisor VMM or indirectly for the virtual machines VMi via the virtualized Roots of Trust RoTi) can be the origin of these related sessions S1 and S2.

The invention thus provides the proof of a verifiable and explicit link between the hardware layer CM which hosts the Root of Trust RoT, the hypervisor VMM, and the virtual machines VM1, VM2 of the virtualized computer platform PIV.

Figure 6:
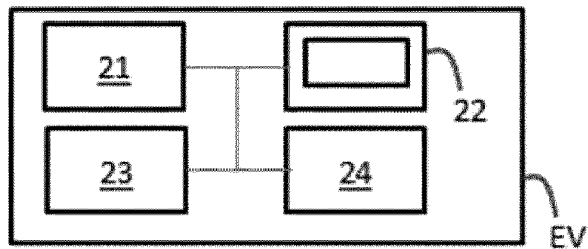
FIG. 6 shows a verifying entity in accordance with a particular embodiment of the invention.

FIG. 6 shows a verifying entity EV in accordance with the invention. In the embodiment described here, this verifying entity EV has the hardware architecture of a computer. It includes a processor 21, a read-only memory of ROM type 22, a random-access memory RAM 23 and communicating means 24.

The read-only memory of ROM type 22 constitutes a recording medium within the meaning of the invention. It includes a computer program in accordance with the invention, this program including instructions able to implement an attestation-requesting method in accordance with the invention and the main steps of which are described with reference to FIG. 3.

When the processor 21 executes the computer program, the verifying entity EV is able to set up, using communicating means 24, a first secure channel with the hypervisor VMM of a virtualized computer platform.

In an embodiment of the invention, the read-only memory 22 includes a protocol stack making it possible to install a server SRV_TLS in the verifying entity EV, this server SRV_TLS being able to set up a secure communication channel with a client CLT_TLS installed in the hypervisor VMM, in accordance with the TLS protocol.

The communicating means 24 are hardware and software means. They are able to receive attestation data DA_VMM from the hypervisor over this first secure channel.

When the processor 21 is configured to send at least one cryptographic datum to the hypervisor VMM over the first secure channel using the communicating means 24. In particular, in the embodiment in which the verifying entity EV and the platform PIV use the TLS protocol, the processor 21 is configured to compute the tickets TICKi and send them over the secure communication channel to the hypervisor VMM.

When the processor 21 executes the computer program, the verifying entity EV is also able to set up, using communicating means 24, a secure channel with each of the virtual machines of the platform PIV.

The verifying entity EV receives the attestation data DA_VMi from these virtual machines, over these secure channels, via the communicating means 24.

The virtualized computer platform PIV can have the hardware architecture of a conventional computer. The invention does not specify the type of hypervisor.

REFERENCES

[TCG]: TCG Virtual Platform WG: Virtualized Trusted Platform Architecture Specification. Specification Version 1.0. Revision 0.26. Sep. 27, 2011.
[NFV]: Network Functions Virtualization (NFV); Trust; Report on Attestation Technologies and Practices for Secure Deployments. ETSI GR NFV-SEC 007 v1.1.1 (2017-10).
[PRA]: G. Coker, J. Guttman, P. Loscocco, A. Herzog, J. Milien, B. O'Hanlon, J. Ramsdell, A. Segall, J. Sheehy, B. Sniffen "Principles of Remote Attestation. Int. J. Inf. Secur. 1, 2 (June 2011), 63-81.
DOI=dx.doi.org/10.1007/s10207-011-0124-7.
[TLS]: E. Rescorla, "The Transport Security Layer (TLS) Protocol Version 1.3", RFC 8446, DOI 10.17487/RFC8446, August 2018.

The invention claimed is:

1. A method for supplying attestations implemented by a virtualized computer platform including a Root of Trust, a hypervisor and at least one virtual machine, the hypervisor implementing a virtualized Root of Trust by hypervisor virtual machine and offering services of the Root of Trust, the method comprising:
setting up a first secure channel between said hypervisor and a verifying entity;
sending attestation data from said hypervisor over said first secure channel toward the verifying entity, said attestation data from said hypervisor being obtained using said services of the Root of Trust;

receiving, by said hypervisor, over said first secure channel, coming from said verifying entity, at least one cryptographic datum intended for said Root of Trust;

setting up a second secure channel between at least one virtual machine and said verifying entity, primitives of the Root of Trust applied to the cryptographic datum being required for the setting-up of said second secure channel; and sending attestation data from said at least one virtual machine over the second secure channel set up for said at least one virtual machine, said attestation data from said at least one virtual machine being obtained by said at least one virtual machine using services of the virtualized Root of Trust associated with said at least one virtual machine.

2. The method of claim 1 wherein:

said verifying entity includes a server;

said hypervisor includes a client, said client and said server are configured to set up between them the first secure channel as part of a first session in accordance with Transport Security Layer (TLS) protocol, and said first secure channel is used:
  by said hypervisor to send its said attestation data to the verifying entity; and
  by said verifying entity to send said cryptographic datum to said hypervisor.

3. The method of claim 2, wherein:

said at least one cryptographic datum includes, associated with each virtual machine of said at least one virtual machine, a ticket and a single-use random variable;

said Root of Trust being configured to compute, for each virtual machine of said at least one virtual machine, a pre-shared key using the single-use random variable associated with this virtual machine;

said shared key being used by said virtual machine to request the setting-up of a second session with said verifying entity, said second session constituting a resumption of said first session in accordance with the TLS protocol; and said second secure channel used by said virtual machine to send its attestation data to said verifying entity being set up as part of said second session.

4. A method for requesting attestations from a virtualized computer platform including a Root of Trust, a hypervisor and at least one virtual machine, the hypervisor implementing a virtualized Root of Trust by hypervisor virtual machine and offering services of the Root of Trust, the method being implemented by a verifying entity and comprising:

setting up a first secure channel between said verifying entity and said hypervisor;

receiving attestation data from said hypervisor in the first secure channel;

sending, to said hypervisor, over said first secure channel, at least one cryptographic datum intended for the Root of Trust;

setting up a second secure channel between said verifying entity and each virtual machine of said at least one virtual machine, primitives of the Root of Trust applied to the cryptographic datum being required for the setting-up of said second secure channel; and receiving attestation data from each virtual machine of said at least one virtual machine over the second secure channel set up for said virtual machine, said attestation data from each virtual machine of said at least one virtual machine being obtained by said virtual machine using services of the virtualized Root of Trust associated with said virtual machine.

5. The method of claim 4, further comprising producing a deep attestation report of said platform, said report being positive if said second secure channel has been set up for said at least one virtual machine, said report including:
  the attestation data from the hypervisor; and
  the attestation data from each virtual machine of said at least one virtual machine.

6. The method of claim 4 wherein:

said verifying entity includes a server;

said hypervisor includes a client, said client and said server are configured to set up between them the first secure channel as part of a first session in accordance with Transport Security Layer (TLS) protocol, and said first secure channel is used:
  by said hypervisor to send its said attestation data to the verifying entity; and
  by said verifying entity to send said cryptographic datum to said hypervisor.

7. The method of claim 6, wherein:

said at least one cryptographic datum includes, associated with each virtual machine of said at least one virtual machine, a ticket and a single-use random variable;

said Root of Trust is configured to compute, for each virtual machine of said at least one virtual machine, a pre-shared key using the single-use random variable associated with said virtual machine;

said shared key is used by said at least one virtual machine to request the setting-up of a second session with said verifying entity, said second session constituting a resumption of said first session in accordance with the TLS protocol; and said second secure channel is used by said at least one virtual machine to send its attestation data to said verifying entity being set up as part of said second session.

8. A virtualized computer platform including a Root of Trust, a hypervisor and at least one virtual machine, the hypervisor implementing a virtualized Root of Trust by hypervisor virtual machine and offering services of the Root of Trust, the virtualized computer platform comprising a processor and a memory, wherein:

said hypervisor is configured to:
  set up a first secure channel with a verifying entity;
  obtain attestation data from said hypervisor using said services of said Root of Trust;
  send said attestation data from said hypervisor over said first secure channel toward the verifying entity; and
  receive, coming from said verifying entity over said first secure channel, at least one cryptographic datum intended for the Root of Trust; and each virtual machine of said at least one virtual machine is configured to:
  set up a second secure channel between said virtual machine and said verifying entity, primitives of the Root of Trust applied to the cryptographic datum being required for the setting-up of this second secure channel; and
  send attestation data from said virtual machine over the secure channel set up for this virtual machine, said attestation data from said virtual machine being obtained by said virtual machine using services of said virtualized Root of Trust associated with said virtual machine.

9. A verifying entity configured to request attestations from a virtualized computer platform including a Root of Trust, a hypervisor and at least one virtual machine, the hypervisor implementing a virtualized Root of Trust by hypervisor virtual machine and offering services of the Root of Trust, said verifying entity including a processor, said verifying entity configured to:
- set up a first secure channel between said verifying entity and said hypervisor;
- receive attestation data from said hypervisor over said first secure channel;
- send at least one cryptographic datum to said hypervisor over said first secure channel, said cryptographic datum being intended for the Root of Trust;
- set up a second secure channel between said verifying entity and each virtual machine of said at least one virtual machine, primitives of the Root of Trust applied to the cryptographic datum being required for the setting-up of said second secure channel; and
- receive attestation data from each virtual machine of said at least one virtual machine over the second secure channel set up for said virtual machine, said attestation from each virtual machine of said at least one virtual machine data being obtained by said virtual machine using services of a virtualized Root of Trust associated with said virtual machine.

10. A set of non-transitory computer readable media including:
- a first non-transitory computer readable medium having stored thereon instructions which, when executed by a first processor, cause the first processor to:
  - set up a first secure channel between a hypervisor and a verifying entity;
  - send attestation data from said hypervisor over said first secure channel toward the verifying entity, said attestation data being obtained using services of a Root of Trust of a virtualized computer platform; and
  - receive at least one cryptographic datum coming from said verifying entity over said first secure channel, said at least one cryptographic datum being intended for the Root of Trust; and
- a second non-transitory computer readable medium having stored thereon instructions which, when executed by a second processor, cause the second processor to:
  - set up a second secure channel between a virtual machine and said verifying entity, primitives of the Root of Trust applied to the cryptographic datum being required for the setting-up of said second secure channel; and
  - send attestation data from said virtual machine over the second secure channel, said attestation data from said virtual machine being obtained by said virtual machine using services of a virtualized Root of Trust from said hypervisor associated with said virtual machine and offering said services of said Root of Trust.

11. A non-transitory computer readable medium having stored thereon instructions which, when executed by a processor, cause the processor to implement a method for requesting attestations from a virtualized computer platform including a Root of Trust, a hypervisor and at least one virtual machine, the hypervisor implementing a virtualized Root of Trust by hypervisor virtual machine and offering services of the Root of Trust, the method being implemented by a verifying entity and comprising:
- setting up a first secure channel between said verifying entity and said hypervisor;
- receiving attestation data from said hypervisor in the first secure channel;
- sending, to said hypervisor, over said first secure channel, at least one cryptographic datum intended for the Root of Trust;
- setting up a second secure channel between said verifying entity and each virtual machine of said at least one virtual machine, primitives of the Root of Trust applied to the cryptographic datum being required for the setting-up of said second secure channel; and
- receiving attestation data from each virtual machine of said at least one virtual machine over the second secure channel set up for said virtual machine, said attestation data from each virtual machine of said at least one virtual machine being obtained by said at least one virtual machine using services of the virtualized Root of Trust associated with said at least one virtual machine.

* * * * *